Nov. 10, 1970  W. A. SHIELDS  3,538,672
APPARATUS FOR DELIVERING CLOSURE CAPS TO VIALS
Filed July 16, 1968  7 Sheets-Sheet 1

FIG.1.

INVENTOR
WALTER A. SHIELDS
BY
John A. Seifert
ATTORNEY

Nov. 10, 1970  W. A. SHIELDS  3,538,672
APPARATUS FOR DELIVERING CLOSURE CAPS TO VIALS
Filed July 16, 1968  7 Sheets-Sheet 4

INVENTOR
WALTER A. SHIELDS
BY
John A. Seifert
ATTORNEY

Nov. 10, 1970 W. A. SHIELDS 3,538,672
APPARATUS FOR DELIVERING CLOSURE CAPS TO VIALS
Filed July 16, 1968 7 Sheets-Sheet 7

INVENTOR
WALTER A. SHIELDS
BY
*John A. Seifert*
ATTORNEY

United States Patent Office 3,538,672
Patented Nov. 10, 1970

3,538,672
APPARATUS FOR DELIVERING CLOSURE CAPS TO VIALS
Walter A. Shields, Jamaica, N.Y.
(38—09 24th St., Long Island City, N.Y. 11101)
Filed July 16, 1968, Ser. No. 745,311
Int. Cl. B67b *57/02;* G07f *11/24*
U.S. Cl. 53—67
10 Claims

ABSTRACT OF THE DISCLOSURE

In the present invention, a closure cap delivering chute is reciprocated toward and away from closure cap sealing means and in synchronism with the intermittent travel of vials toward said sealing means. The leading closure cap in the chute is positioned in vertical alignment with and between the closure cap sealing means and a vial. Subsequently the vial is lifted into said leading closure cap and part of the sealing means engage the closure cap. The closure cap succeeding the leading closure cap in the chute is retained against advancement when the sealing means is in non-sealing position, in the absence of a vial succeeding the vial receiving the leading closure cap, and during the travel of the vials.

---

This invention relates to an apparatus including an intermittently actuated conveyor for receiving vials in equidistantly spaced recesses from a vial feeding and positioning device and subsequently presenting said vials to a device for filling each vial with a liquid medicament, to a reciprocating closure cap delivery chute arranged to position successive closure caps in vertical alignment above successive vials, to means to raise a vial into a leading closure cap in the chute, and to means to seal said closure cap to said vial, and particularly to the reciprocating closure cap delivery chute overcoming the disadvantages of prior art delivery chutes wherein the closure caps were placed on the vials at a distance from the closure cap sealing means and during the travel to the sealing means the closure caps were subjected to accidental dislodgement from the vials. The closure cap delivery chute is also provided with adjustable stop means to prevent the delivery of closure caps to the closure cap sealing means and the vial raising means, and actuated to permit the feed of closure caps to the closure cap sealing means and the vial raising means by the movement of said closure cap sealing means to sealing position. Also said adjustable stop means is actuated to prevent the delivery of closure caps regardless of the position of the closure cap sealing means in the absence of a vial in a recess of the conveyor just prior to the positioning of said recess in alignment with the closure cap sealing means and the vial raising means.

The embodiment of the invention is shown in conjunction with apparatus for filling vials with a liquid medicament including a conveyor in the form of a circular turret 17 rotatably supported by a shaft 18 intermittently rotated by suitable means, not shown, supported below a table 19. The turret 17 is provided with equidistantly spaced recesses 20 to slidably engage the upper portions of vials v having the bottoms slidably supported on a platform 21 fixedly mounted on the table 19 and spaced below the turret 17, as shown at 22 in FIGS. 1 and 2. The vials v are retained in the recesses 20 by a rail 23 supported by posts 24 from the table 19, as shown in FIG. 1.

The bottoms of the vials are closed by a plunger p for expelling a liquid medicament from the vials through a beaded mouth m at the top of the vials. The vials v are delivered from a hopper 25 mounted on the table 19 at the side of the turret 17. The vial delivery mechanism is indicated in a general manner at 26 in FIGS. 1 and 2, and is arranged to deliver a vial to successive recesses 20 in the turret 17 with the bottoms of the vials v on the platform 21 and the mouths m extending above the turret 17.

Figure 1:
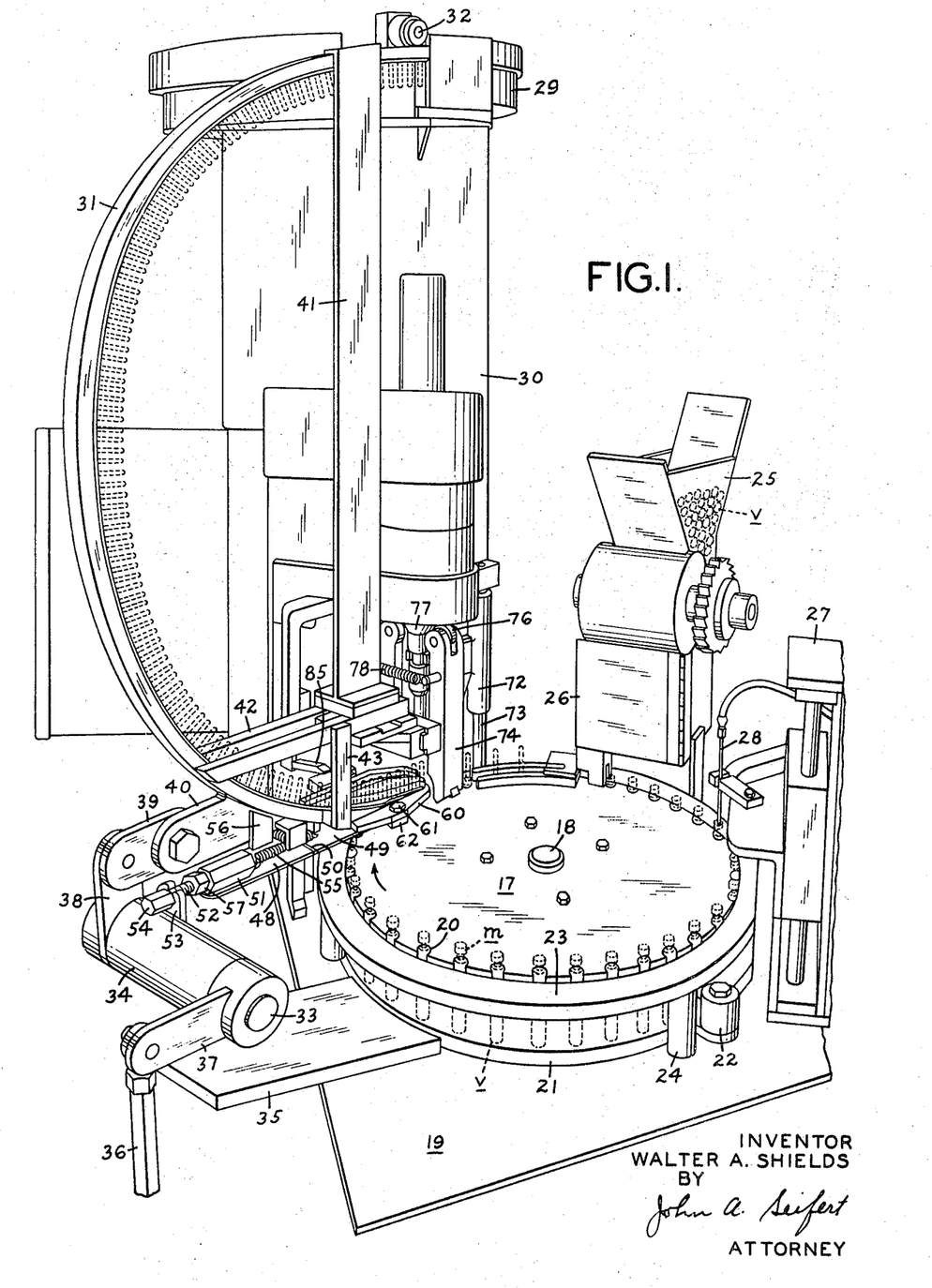
FIG. 1 is a perspective view of apparatus showing the position of the reciprocating closure cap delivery chute and the closure cap sealing means in relation to the vial feeding and positioning device and the liquid medicament filling device.
Figure 2:
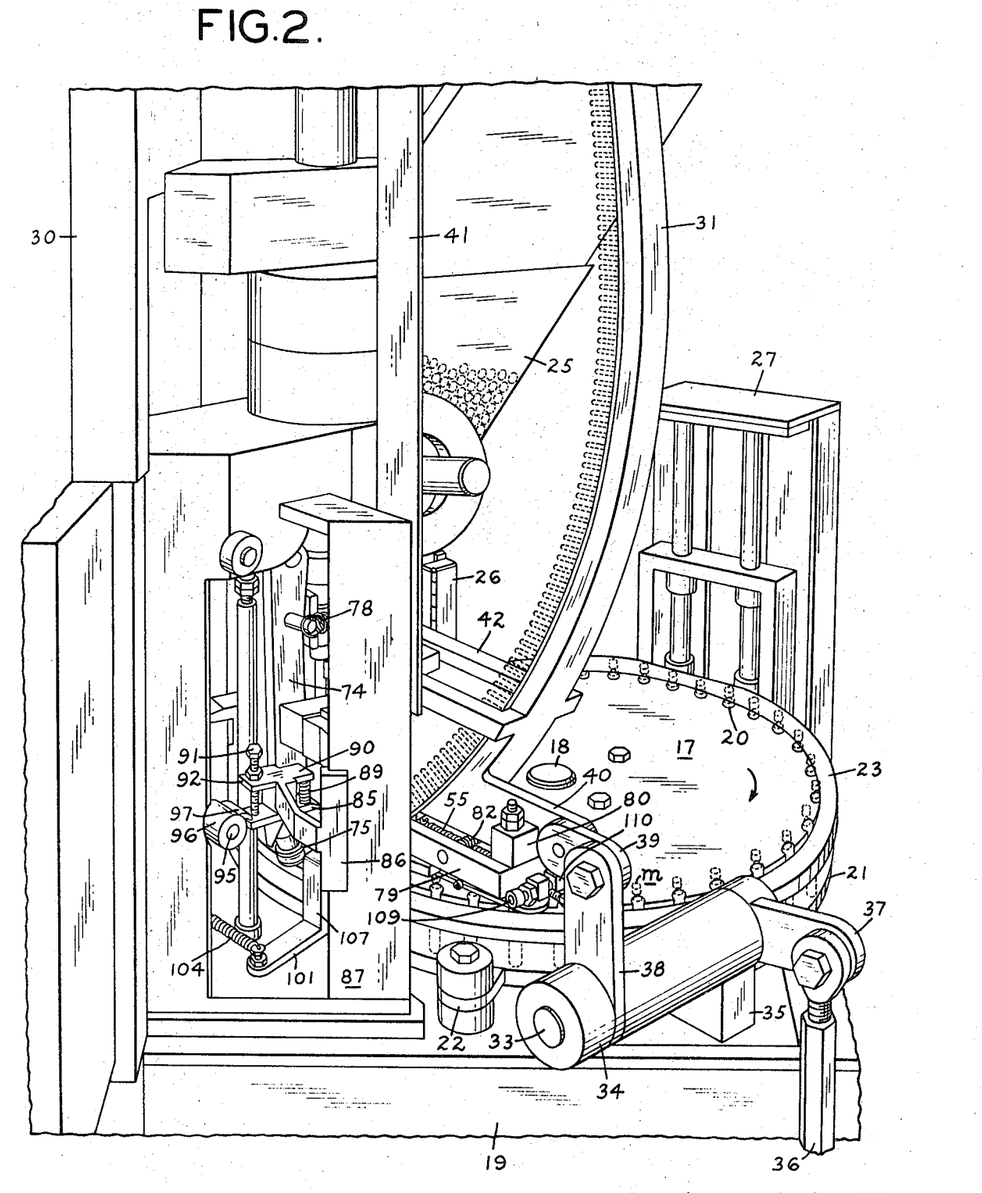
FIG. 2 is another perspective view of the apparatus looking at the rear of the reciprocating closure cap delivery chute and at the left side of FIG. 1.

The vials v are successively presented by the intermittent rotation of the turret 17 to a filling device indicated in a general manner at 27 in FIGS. 1 and 2, and having a nozzle 28 to deliver a predetermined quantity of liquid medicament to each successive vial on the turret 17.

The present invention is concerned with the delivery of closure caps c having a shielded hypodermic needle n secured therein, to the mouths m of the filled vials v. Said closure caps c are delivered from a hopper 29, FIG. 1, supported above the table 19 by standards 30 mounted on said table. The closure caps are delivered by a curved chute 31 having the receiving end pivotally supported at 32 in FIG. 1 and the delivery end of the chute is connected to a rock-shaft 33 supported in a bearing 34 on a bracket 35 extended from the table 19. The rock-shaft 33 is actuated by suitable mechanism, not shown, supported below the table 19, and connected to the rock-shaft 33 by a link 36 pivotally connected to a crank 37 secured on one end of the rock-shaft. A second crank 38 is secured on the opposite end of the rock-shaft 33 and extended from said rock-shaft at approximately a ninety degree angle to the first crank 37. Said second crank 38 is pivotally connected by a link 39 to an arm 40 extended from the chute 31 adjacent to the delivery end thereof whereby the delivery end of the chute is reciprocated relative to the path of travel of the vials v. The receiving and delivery ends of the chute 31 are approximately in vertical alignment with each other and are retained in this position by a vertical reenforcing member 41 secured at its upper end to the chute 31 adjacent to the pivotal support 32 and at its lower end to a horizontal brace 42 fixed to the chute 31 and reenforced by a vertical brace 43 attached to the chute, as shown in FIGS. 1 and 2.

Figures 6, 8:
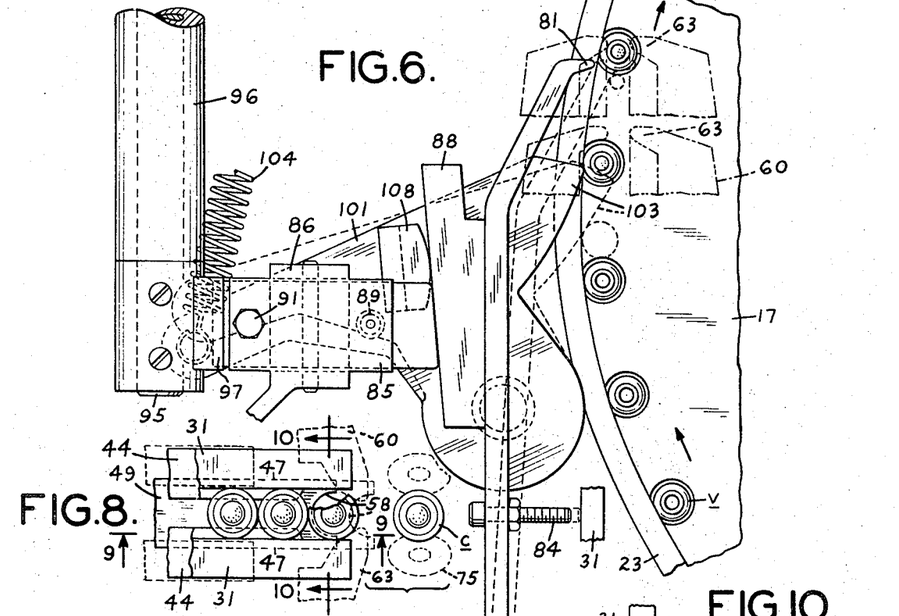
FIG. 6 is a plan view of the adjustable stop means, on a larger scale, and showing the adjustable stop means in full lines positioned to permit the feed of a succeeding closure cap to the closure cap sealing means and the vial raising means, and in broken lines preventing the delivery of said closure cap.
FIG. 8 is a fragmentary plan view of the delivery end of the closure cap chute with said chute in retrograde position and the leading closure cap removed from said chute and positioned on a vial.
Figures 7, 9, 10:
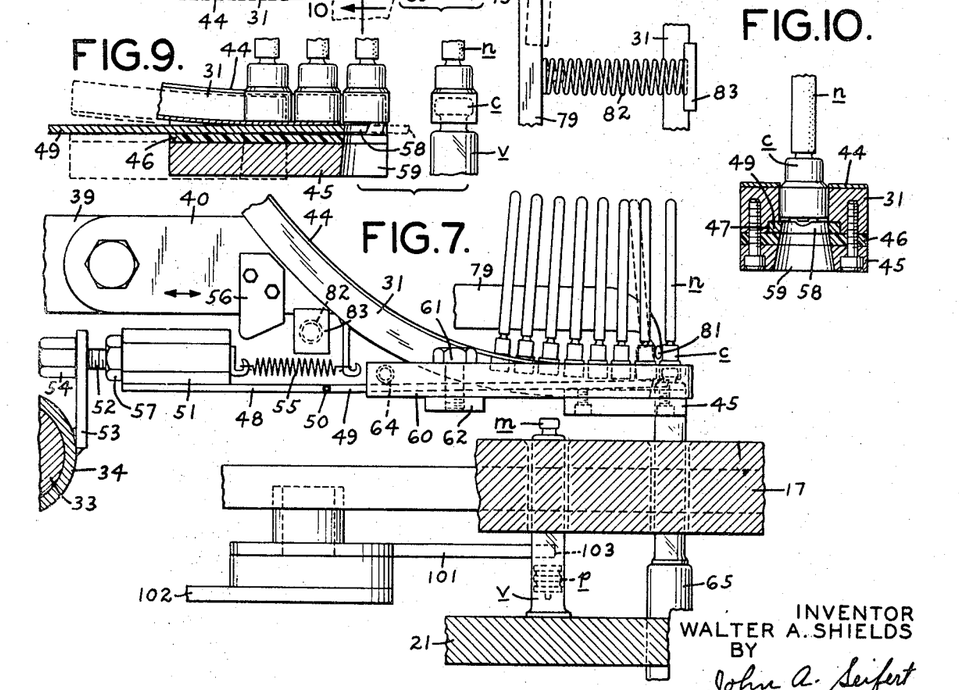
FIG. 7 is an elevational view, on an enlarged scale, looking from the line 7—7 of FIG. 4 in the direction of the arrows and showing the delivery end of the closure cap delivery chute in its advanced position with the adjustable stop means positioned to retain the advance of the closure caps succeeding the leading closure cap in the chute, and means associated with the closure cap chute to retain the leading closure cap relative to a raised vial during the retrograde movement of the chute.
FIG. 9 is a sectional view taken on the line 9—9 of FIG. 8 looking in the direction of the arrows.
FIG. 10 is a cross-sectional view taken on the line 10—10 of FIG. 8 looking in the direction of the arrows.

The chute 31 is of channel shape in cross-section with the channel partly closed by flanges 44, as shown in FIGS. 4 and 7 to 10, inclusive, to engage the closed end of the closure caps and retain the closure caps in the chute particularly when leaving the hopper 29 due to fact the channel of the chute opens to the inner arc of the chute. The closure caps leave the hopper 29 with the shielded hypodermic needles n inverted and extending in a downward direction between the flanges 44 and are gradually revolved one hundred eighty degrees when they are at the delivery end of the chute 31. The delivery end of the chute is positioned above the path of travel of the vials v on the conveyor turret 17 with the bottom of the chute spaced from the top of said turret, as shown in FIGS. 5 and 7.

The bottom of the chute 31 at the delivery end thereof is open, as shown in FIGS. 5 and 7 to 10, inclusive, and is provided with a slideway formed by a block 45 secured to the bottom of the chute at opposite sides of the channel of the chute with a layer 46 of plastic interposed between the block 45 and the bottom of the chute, as shown in FIGS. 9 and 10. The bottom of the chute 31 is also provided with a groove 47 on each side of the channel of the chute and above the plastic layer 46 for the sliding mounting of a tongue on the plastic layer 46 which acts as a bearing surface. Said tongue comprises two parts 48 and 49 pivotally connected to each other at 50, as shown in FIGS. 1 and 7, tongue part 48 being secured to a block 51 having a stud 52 adjustably mounted therein and slidable in a bracket 53 secured on the bearing 34, with a head 54 on the stud 52 limiting the movement of the tongue 48, 49 with the forward movement of the chute 31. The pivotal connection 50 permits the tongue part 49 to move in the grooves 47 with the chute 31 in its closure cap feeding movement imparted thereto by the rock-shaft 33. The feeding or forward movement of the chute is imparted to the tongue 48, 49 through a spring 55 anchored to the chute 31 and the block 51, as shown in FIG. 7. The forward movement of the tongue 48, 49 is determined by the adjustment of the stud 52 in the block 51. Retrograde movement is imparted to the tongue 48, 49 by the retrograde movement of the chute 31 by a projection 56 on the arm 40 abutting the block 51 and move a lock-nut 57 on the stud 52 against the bracket 53. The forward end of the tongue part 49 is provided with an arcuate recess 58 corresponding to the arc of the circumference of the closure caps. In the forward or advanced position of the chute 31 and the tongue 48, 49, the recess 58 registers with an arcuate recess 59 in the forward end of the block 45 for a purpose to be described hereinafter. The forward or feeding movement of the chute 31 and the tongue 48, 49 will engage the recess 58 with the leading closure cap c in the chute 31 as said leading closure cap will drop slightly into the recess 59 of the block 45 and due to the pivotal connection 50, the portion of the tongue part 49 adjacent to its recess 58 will engage and help in the tilting of the closure cap succeeding the leading closure cap, as shown in FIG. 7.

Figures 4, 5:
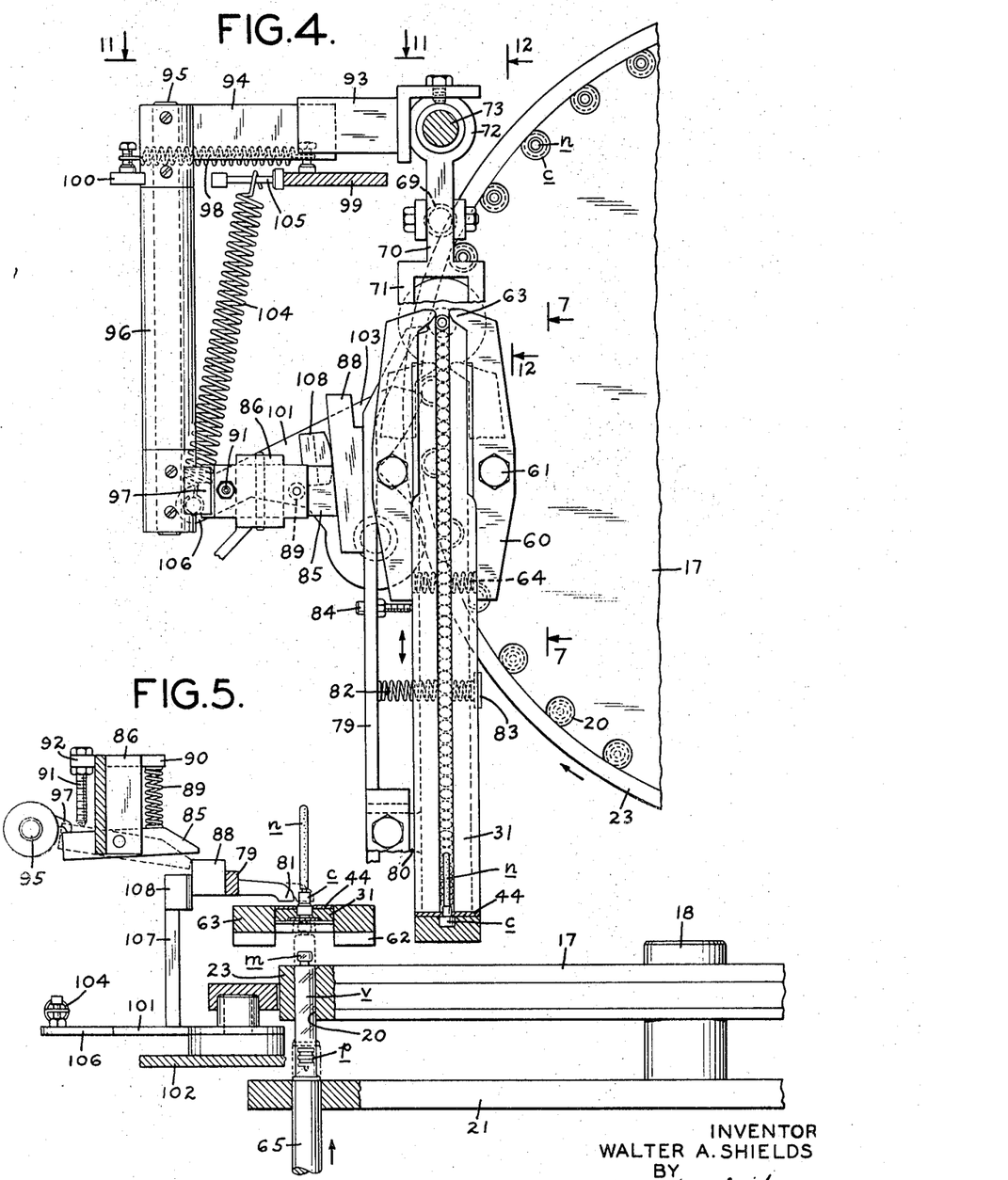
FIG. 4 is a plan view of the delivery of of the closure cap delivery chute positioning a closure cap in alignment with the closure cap sealing means and the vial raising means, and the adjustable stop means in position to permit the feed of a succeeding closure cap to the closure cap sealing means and the vial raising means.
FIG. 5 is an elevational view showing in full lines the adjustable stop means in its position shown in FIG. 4 and in broken lines its position preventing the delivery of said closure caps.

The leading closure cap c is yieldingly retained in the chute 31 by a pair of levers 60 pivotally mounted by pins 61 on lugs 62 extended from the opposite sides of the chute 31. The front ends of the levers 60 are provided with inwardly extending jaws 63 yieldingly urged to engage the leading closure cap c under the influence of a spring 64 compressed between the rear end portions of the levers 60, as shown in FIGS. 4 and 7.

While the leading closure cap c is retained by the jaws 63 in vertical alignment above the recess 59 in the advanced position of the chute 31 and the turret 17 has positioned a vial v in vertical alignment below said recess 59, said vial v is raised into the recess 59 and the leading closure cap c by a plunger 65 slidable in the platform 21 and vertically reciprocated by suitable mechanism, not shown, mounted below the table 19.

After the vial v is engaged in the leading closure caps c, retrograde movement is imparted to the delivery end of the chute 31 and before the chute 31 has completed its retrograde movement, the lock-nut 57 will abut the bracket 53 and arrest the retrograde movement of the tongue 48, 49 and position the recessed end 58 beyond the delivery end of the chute 31 before said chute has attained its extreme retrograde position, as shown in the broken line positions of the chute and the recessed end of the tongue in FIGS. 8 and 9. The positioning of the recessed end 58 beyond the delivery end of the chute will push the leading closure cap past the jaws 63 and said jaws 63 will automatically engage the succeeding closure cap and retain the closure caps in the chute 31 during the continued retrograde movement of the chute 31.

Figure 15:
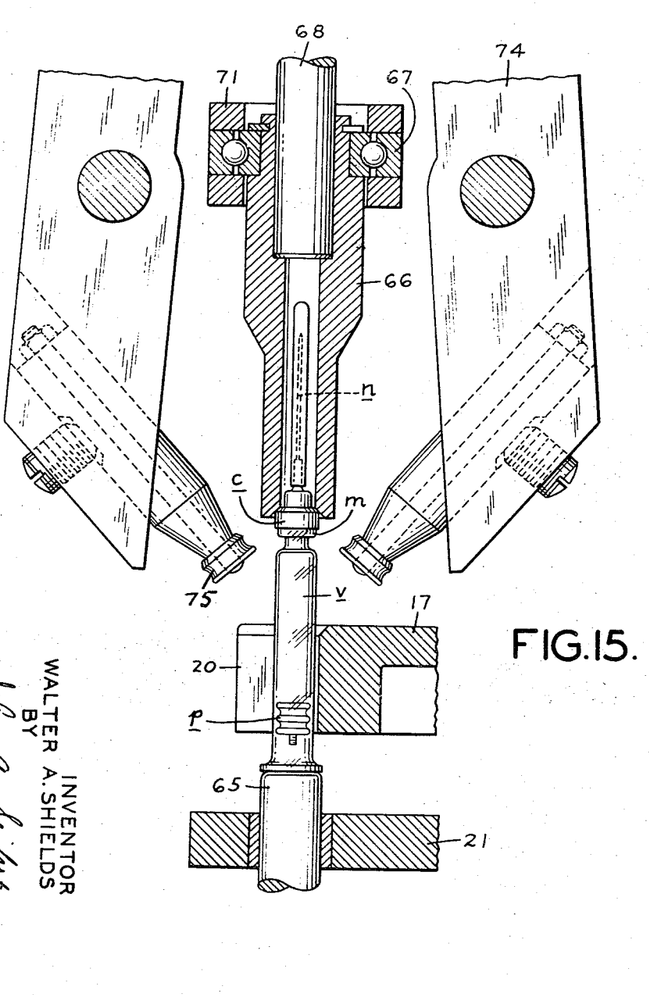
FIGS. 15 and 16 are elevational views of the closure cap sealing means showing the sealing means prior to and in sealing position, respectively.
Figure 16:
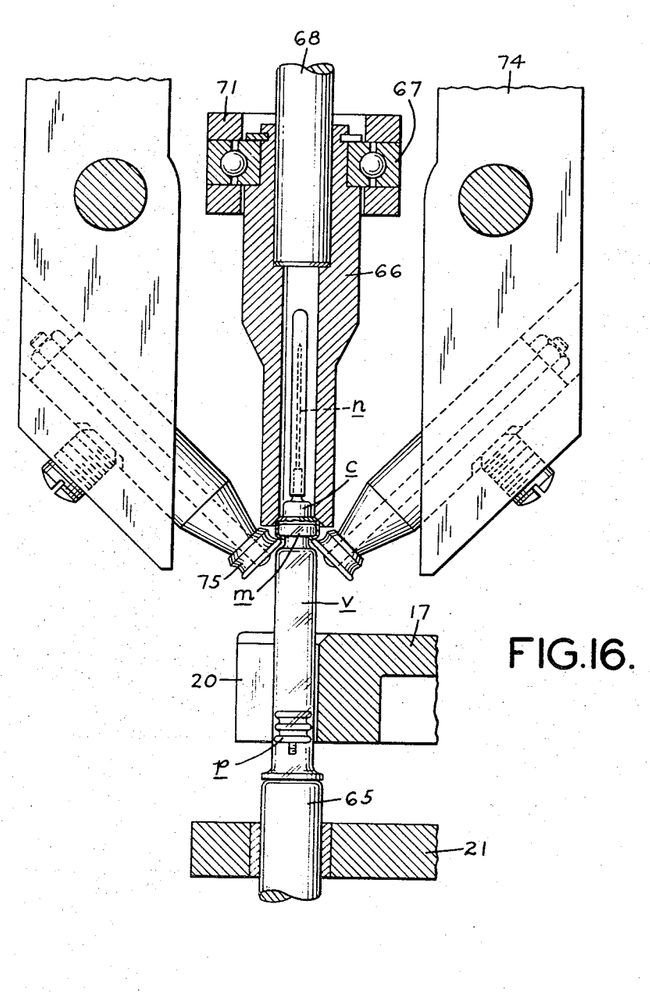

In the extreme retrograde position of the delivery end of the chute 31, said end of the chute and the recessed end 58 of the tongue 48, 49 will be spaced from the engaged closure cap c and the vial v, as shown in FIGS. 8 and 9, and during this period of reciprocation of the chute 31, said closure cap is sealed to said vial by sealing means mounted in vertical alignment with the plunger 65 and above the delivery end of the chute 31. Said sealing means is shown in a general manner as comprising a hollow head 66 rotatably mounted in a ball-bearing race 67 with the head 66 secured to a shaft 68 continuously rotated by motive means, not shown. The head 66 is reciprocated in a vertical plane toward and away from the closure cap c engaged on the raised vial v by a rod 69, FIGS. 3 and 12, actuated by means, not shown, mounted below the table 19, and said rod 69 is pivotally connected to an arm 70 having a forked bifurcation 71 at one end with the forks engaging the ball-bearing race 67 and the opposite end of the arm 70 arranged with a sleeve 72 slidably mounted on a post 73 extended upwardly from the table 19. The head 66 is actuated to engage the closure cap simultaneously with the raising of the vial into said closure cap in the extreme retrograde position of the chute 31. The other part of the closure cap sealing means comprises a pair of levers 74 pivotally mounted on diametrically opposite sides of the head 66 in the manner shown and described in my Pat. No. 2,994,172 issued Aug. 1, 1961. The lower ends of the levers 74 are provided with crimping tools 75 positioned in a horizontal plane below the lower end of the head 66 and the upper ends of the levers 74 are arranged with rollers 76, FIG. 1, to engage a tapering faced cam 77 slidable on the shaft 68 and reciprocated independently of the head 66 in the manner disclosed in my patent No. 2,994,172. The rollers 76 of the levers 74 are yieldingly urged into engagement with the cam 77 by springs 78, shown in FIGS. 1 and 2, so that when said cam 77 is in its upper position, the crimping tools 75 are spaced from the closure cap c, as shown in FIG. 15. When the closure cap c is engaged by the head 66, the shielded needle n extends into the hollow of said head 66. The engagement of the closure cap c by the rotating head 66 will rotate said closure cap c and the vial v. The vial v could be rotatably supported by the plunger 65 or said plunger could be rotated in the manner shown in my Pat. No. 2,994,172. The closure cap c and the vial v are engaged by the head 66 and the plunger, respectively, while the crimping tools 75 are positioned from the closure cap c and the vial v, as shown in FIG. 15. Subsequent to the engagement of the closure cap and the vial, and the spinning of said closure cap and vial, the cam 77 is lowered to force the crimping tools 75 into engagement with the skirt portion of the closure cap below the mouth m and the revolving of the closure cap will cause the tools 75 to crimp the closure cap to the vial, as shown in FIG. 16. After the closure cap is crimped to the vial, the cam 77 is lifted to permit the springs 78 to actuate the crimping tools 75 from the FIG. 16 position to the FIG. 15 position and subsequently the head 66 is lifted and the plunger 65 is lowered to permit the sealed closure cap and its vial to be moved by the turret 17 from the sealing means.

Figure 3:
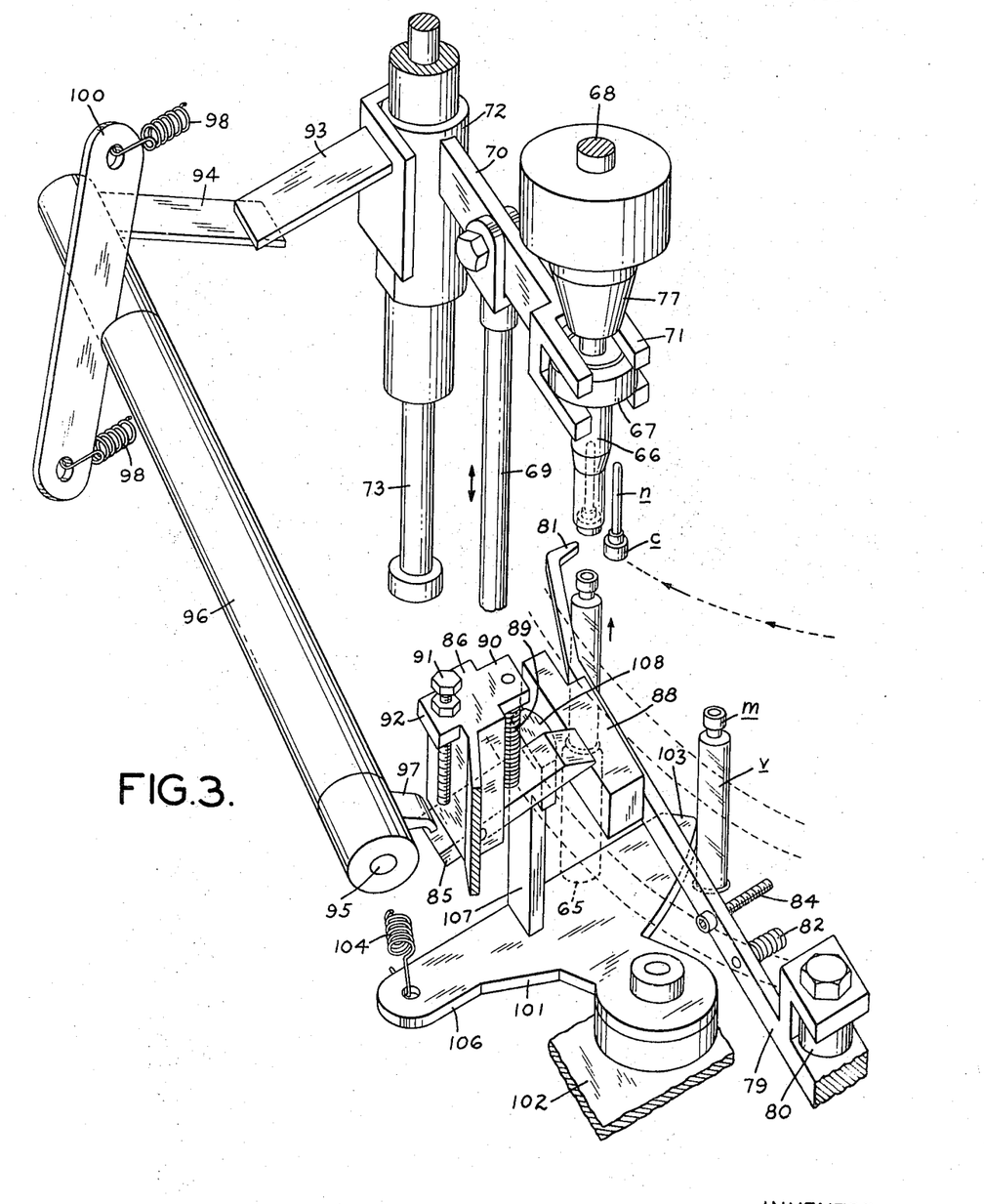
FIG. 3 is a perspective view of the arrangement of parts for controlling the delivery of closure caps to the closure cap sealing means and the vial raising means, and showing said parts adjusted to permit the delivery of a closure cap to the closure cap sealing means and the vial raising means.
Figures 11, 12:
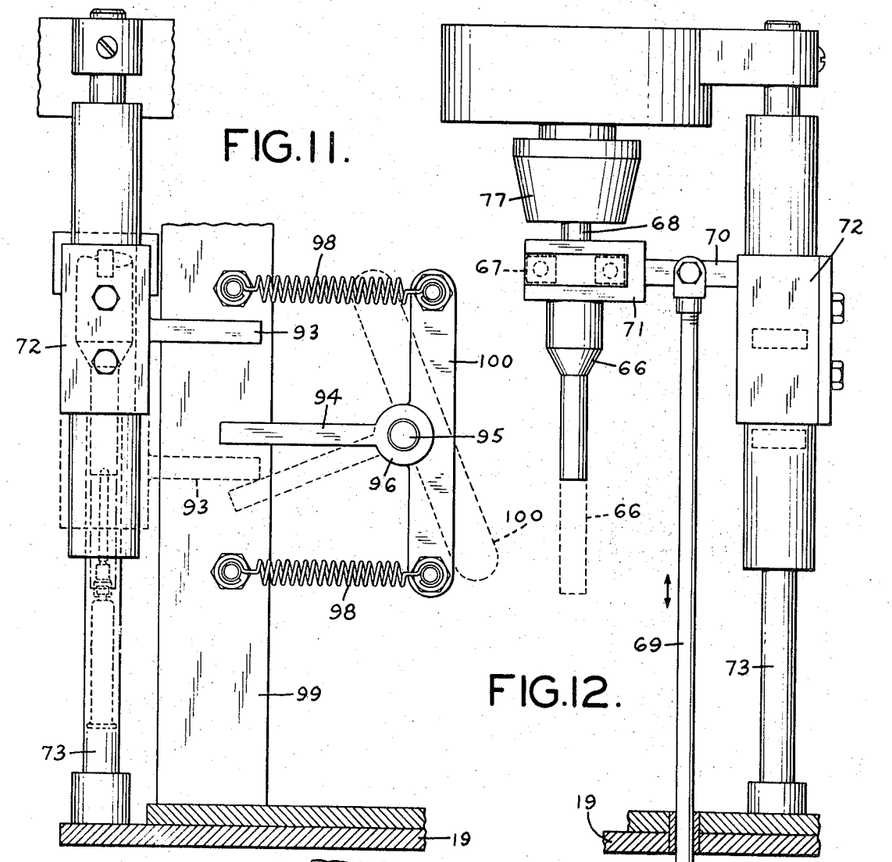
FIGS. 11 and 12 are elevational views of closure cap sealing means looking respectively from the lines 11—11 and 12—12 of FIGURE 4 in the direction of the arrows.
Figure 13:
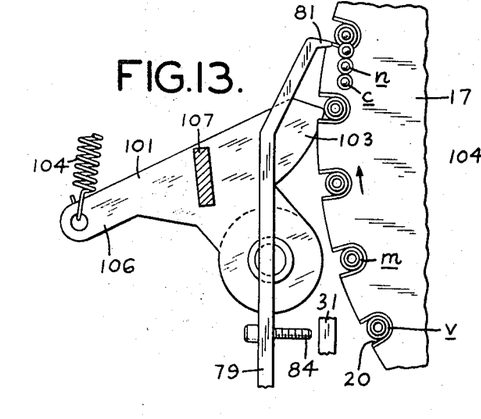
FIGS. 13 and 14 are fragmentary plan views of the means to actuate the adjustable stop means by the presence or absence of a vial traveling toward the closure cap sealing means and the vial raising means, FIG. 13 showing said stop means actuated out of the path of travel of the closure caps in the chute, and FIG. 14 showing said stop means retaining the closure caps in the chute.
Figure 14:
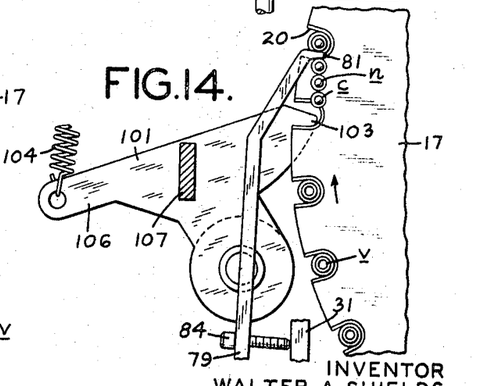

In the advanced position of the delivery end of the chute 31, the closure cap c in the chute 31 suceeding the closure cap c being engaged by the vial v is prevented from advancing by adjustable stop means in the form of a lever 79 pivoted at one end on a bracket 80 attached to the chute 31, as shown in FIG. 4, and the opposite end of the lever is bent toward the chute and provided with a nose 81 which is adapted to be positioned between the leading and succeeding closure caps c, as shown in FIGS. 7 and 14. The positioning of the nose 81 between the leading and succeeding closure caps c will also tip the succeeding closure cap from the leading closure cap with the help of the tongue part 49, as shown by the broken line position of the succeeding closure cap in FIG. 7. The nose 81 is urged away from its position between the leading and succeeding closure caps by a spring 82 compressed between an intermediate portion of the lever 79 and an abutment 83 on the chute 31, as shown in FIGS. 4, 6 and 7. The movement of the nose 81 to its position between the leading and succeeding closure caps c is limited by a stop in the form of a screw 84 adjustably mounted in the lever 79 to abut the chute 31. The lever 79 is actuated to normally position the nose 81 between the leading and succeeding closure caps c when the head 65 is in non-sealing position. This is accomplished by a lever 85 pivotally mounted in the center on a bracket 86 extended laterally from a vertical brace 87 mounted on the table 19, as shown in FIG. 2. One end of the lever 85 is depressed to engage a block 88 on the lever 79 between the stop screw 84 and the nose 81 by a spring 89 compressed between said lever 85 and an ear 90 projected from the bracket 86. The engagement of the lever 85 with the block 88 will move the nose 81 between the leading and succeeding closure caps against the force of the spring 82. The depressing movement of the lever 85 is limited by a stop screw 91 adjustably mounted in another ear 92 of the bracket 86 to abut the opposite end of the lever 85. During the downward movement of the head 66 to engage the leading closure cap, the forward movement of the succeeding closure cap is prevented by the jaws 63 and therefore the lever 85 is actuated out of engagement with the block 88. This is accomplished by a tripper bar 93 secured to the sleeve 71 at right angles to the arm 70 to depress a projection 94 fixed to and extended from one end of a shaft 95 rotatably supported in a sleeve 96 mounted on one of the standards 30, as shown in FIG. 2. The opposite end of the shaft 95 is provided with a tripper 97 adapted to engage the end of the lever 85 opposite the end engaging the block 88. The shaft 95 is normally adjusted to position the projection 94 in a horizontal plane by a pair of springs 98 anchored at one end to an upright 99 of the table 19 and the opposite ends of the springs 98 are connected to the opposite ends of a transverse member 100 connected at the center to the projection 94, as shown in FIGS. 3, 4 and 11. The springs 98 will also position the tripper 97 out of engagement with the lever 85. The lever 85 under the influence of the spring 89 will position the nose 81 between the leading and succeeding closure caps c in the chute 31 during the feeding movement of the chute 31.

The nose 81 will also assume this closure cap separating or retaining position regardless of the position of the lever 85 when a vial is not in a recess 20 of the turret 17 succeeding the recess 20 in vertical alignment with the head 66 and the plunger 65. This is accomplished by a trigger member in the form of a plate 101 pivotally mounted on a bracket 102 extended from the table 19 and having a nose 103 projecting into the path of travel of the vials on the turret 17 to engage a vial in a recess succeeding the recess 20 holding the vial in vertical alignment with the head 66 and the plunger 65. The nose 103 is normally actuated into this position by a spring 104 having one end slidably mounted on a rod 105, FIG. 4, extended from the upright 99 and the opposite end of said spring 104 being connected to a projecting part 106 of the plate 101. The plate 101 is provided with a vertical post 107 arranged with a bumper 108 to engage the block 88 of the lever 79 under the influence of the spring 104. When the nose 103 does not engage a vial during the period of rest of the turret 17, the bumper 108 will move the nose 81 into the path of the closure caps c in the chute 31 against the force of the spring 82. Also the nose 81 will be intermittently actuated to its closure cap retaining position during the intermittent travel of the vials v, as shown in broken lines in FIG. 6. The movement of the nose 81 from between the leading and succeeding closure caps c is limited by a stop 109 adjustably mounted on the rail 23 to abut a projection 110 extended from the lever 79, FIG. 2.

After the closure cap c is sealed to the vial v, it is intermittently moved along the platform 21 by the turret 17 to means to discharge the capped vial from the turret 17 and the platform 21, such as the means shown in my Pat. No. 2,978,180 issued June 6, 1961.

Having thus described my invention, I claim:

1. In apparatus for delivering closure caps to vials, a chute having a closure cap receiving end and a closure cap delivery end, said closure cap receiving end being pivotally mounted, means connected to the chute and arranged to reciprocate the closure cap delivery end and impart closure cap feeding movement and retrograde movement to the delivery end of the chute, means pivotally mounted on the chute and yieldingly urged to retain the closure caps in the chute, and a member slidably supported by the delivery end of the chute, having limited sliding movement and yieldingly connected to the chute to reciprocate with the chute and move the leading closure cap past the retaining means and out of the chute during the retrograde movement of the delivery end of the chute.

2. Apparatus for delivering closure caps to vials as claimed in claim 1, wherein the means to reciprocate the closure cap delivery end of the chute comprises a rockshaft pivotally connected to the chute adjacent to said delivery end.

3. Apparatus for delivering closure caps to vials as claims in claim 1, wherein the means to retain the closure caps in the chute comprises a pair of levers, each lever being pivotally mounted on a side of the chute and one end of each lever having a jaw positioned at the delivery end of the chute, and a spring compressed between the opposite ends of the levers to yieldingly urge the jaws toward each other and into engagement with the leading closure cap in the chute.

4. Apparatus for delivering closure caps to vials as claimed in claim 1, wherein the member slidably supported by the delivery end of the chute comprises two parts pivotally connected to each other, one part being slidably supported by the chute and the other part having limited movement toward and away from the leading closure cap in the chute and yieldingly connected to the chute.

5. In apparatus for delivering closure caps to vials as claimed in claim 1, means to support equidistantly spaced vials and intermittently position successive vials below and in alignment with the leading closure cap in the chute, a lever pivotally mounted and having an end portion adapted to be positioned between the leading and succeeding closure caps in the chute, said end portion being yieldingly urged from said position between the leading and succeeding closure caps.

6. In apparatus for delivering closure caps to vials as claimed in claim 5, a member pivotally mounted adjacent to the vial supporting and positioning means and yieldingly urged to engage the vial succeeding the vial positioned below the leading closure cap in the chute and said member being arranged to actuate the end portion of the lever to a position between the leading and succeeding closure caps in the absence of a vial succeeding the vial positioned below the leading closure cap in the chute.

7. In apparatus for delivering closure caps to vials as claimed in claim 1, means to support equidistantly spaced vials and intermittently position successive vials below and in alignment with the leading closure cap in the chute, means reuiprocally mounted and positioned above and in alignment with the leading closure cap in the chute in the advanced position of the chute and arranged with tools to crimp the leading closure cap to the vial positioned below said leading closure cap, a lever pivotally mounted and having an end portion adapted to be positioned between the leading and succeeding closure caps in the chute and said and portion being yieldingly urged from said position between the leading and succeeding closure caps, and a member yieldingly urged to move the lever and position the end of the lever between the leading and succeeding closure caps and actuated by the crimping tools means to position the end of the lever from between the leading and succeeding closure caps in the crimping position of said crimping tools means.

8. Apparatus for delivering closure caps to vials as claimed in claim 1, wherein the bottom of the delivery end of the chute is open and provided with a block having a recess below the leading closure cap in the chute, means to successively position vials below said recess in the block, and means to raise a vial from said vial positioning means into said recess and the leading closure cap in the chute in the advanced position of the chute.

9. Apparatus for delivering closure caps to vials as claimed in claim 1, wherein the chute is provided with means to impart the retrograde movement of the delivery end of the chute to the member slidably supported by the delivery end of the chute.

10. Apparatus for delivering closure caps to vials as claimed in claim 4, wherein the leading edge of the part slidably supported by the chute is provided with an arcuate recess corresponding to the circumference of the closure caps.

References Cited
UNITED STATES PATENTS

| | | | |
|---|---|---|---|
| 2,841,940 | 7/1958 | Brown | 53—311 |
| 1,870,999 | 8/1932 | Kantor | 221—188 |
| 3,247,641 | 4/1966 | Ridley | 53—67 |

THERON E. CONDON, Primary Examiner

H. M. CULVER, Assistant Examiner

U.S. Cl. X.R.

53—334; 221—188